United States Patent [19]

Stahlecker

[11] 4,041,688
[45] Aug. 16, 1977

[54] BEARING MEANS FOR SPINNING ROTORS OF AN OPEN-END SPINNING MACHINE

[75] Inventor: Hans Stahlecker, Suessen, Germany

[73] Assignees: Fritz Stahlecker; Hans Stahlecker, Germany

[21] Appl. No.: 600,054

[22] Filed: July 29, 1975

[30] Foreign Application Priority Data

Aug. 10, 1974 Germany .............................. 2438527

[51] Int. Cl.² .......................................... D01H 1/241
[52] U.S. Cl. .................................... 57/104; 57/58.89; 308/26
[58] Field of Search ......... 57/1 R, 34 R, 58.89–58.95, 57/104–105; 308/26

[56] References Cited

U.S. PATENT DOCUMENTS

| 3,779,620 | 12/1973 | Stahlecker | 57/58.89 X |
| 3,805,506 | 4/1974 | Stahlecker | 57/58.89 X |
| 3,807,157 | 4/1974 | Stahlecker | 57/58.89 |
| 3,838,560 | 10/1974 | Stahlecker | 57/58.89 |

Primary Examiner—Richard C. Queisser
Assistant Examiner—Charles Gorenstein
Attorney, Agent, or Firm—Craig & Antonelli

[57] ABSTRACT

In order to reduce the noise generated by the bearing means for a spinning rotor in which the spinning rotor is mounted in a wedge formed by supporting rings and driven by a tangential belt, one common pillow block is provided for all of the supporting rings of a spinning unit, whereby the pillow block is supported in an elastic manner. The bearing conditions do not change in spite of the resiliency, as the individual members do not perform any relative motions one to the other. In order to further preclude the formation of undesired axial forces as a result of the movement of the shaft of the spinning rotor relative to the tangential belt, the elastic supporting means permit movements in only one specific direction, thereby preventing alteration of the axial force between tangential belt and spinning rotor.

14 Claims, 10 Drawing Figures

BEARING MEANS FOR SPINNING ROTORS OF AN OPEN-END SPINNING MACHINE

The present invention relates to a bearing means for a spinning rotor of a spinning unit of an open-end spinning machine comprising a plurality of spinning units, the spinning rotor having a shaft which is driven by a tangential belt and which is mounted in a wedge formed by supporting rings.

It is known practice (German Disclosed Patent Application No. 2,123,231) for the rotor shafts of the spinning rotors to protrude into an uninterrupted channel extending longitudinally through the machine, in which channel the shafts are mounted and driven. As a result of this bearing means, which is sealed off from the outside, it is possible to prevent a significant portion of the noise generated by the drive and bearing means from reaching the outside.

In this connection, it is also known practice (German Disclosed Patent Application No. 2,157,021) to locate the bearings of supporting rings in sections which extend past a plurality of spinning points. These sections are attached to appropriate profiles on the bottom of the channel. Moreover, in this connection it is also known practice to attach an oscillation dampening base between the bottom of the channel and the sections, thereby further reducing the noise carried to the outside.

In actual practice, it has been found that the elastic, oscillation-dampening support of the supporting ring bearings causes difficulties and cannot readily be realized. There is a danger of the formation of seesaw oscillations, which cause the entire bearing means, and thus also the individual rotor shafts, to oscillate in the direction of travel of the tangential belt or, especially, at right angles thereto. These oscillations cause the rotor shafts to assume more or less misaligned attitudes which are not at right angles to the direction of travel of the tangential belt, causing the tangential belt to exert an axial force on them. This axial force can either eliminate or significantly increase the axial force produced by other means, with which the rotor shafts are pressed against step bearings. If the axial force is eliminated, there is a danger of the rotor wandering, thereby improperly altering the spinning conditions in the interior of the rotor, which are governed by the members projecting into the rotor. If the axial force is significantly increased, there is a danger of premature destruction of the step bearings as a result of overloading.

It is the object of the present invention to create a bearing means for spinning rotors retained in wedges by supporting rings, in which soundproofing and oscillation dampening are maintained without the danger of the rotor shafts moving improperly. According to the present invention, this object is solved in that there is one common pillow block for all bearings of the supporting rings of a spinning unit, the pillow block being retained by elastic supporting means having a preferred direction of movement and preventing seesaw movements about an axis located at right angles to the shaft of the spinning rotor.

This bearing means, in which each rotor shaft is supported independently of the other, ensures that the rotor shafts can generally only move in such a manner that the parallelism to their original attitude is not eliminated. This measure permits those members adjacent to the spinning rotor to also have closer manufacturing tolerances, which provides spinning advantages, as the same spinning conditions can always be precisely maintained.

The above discussed and other objects, features and advantages of the present invention will become more apparent from the following description thereof, when taken in connection with the accompanying drawings, in which FIG. 1 shows a partial view of an open-end spinning machine with an opened channel for the bearing means for spinning rotors according to the present invention;

Figure 1:
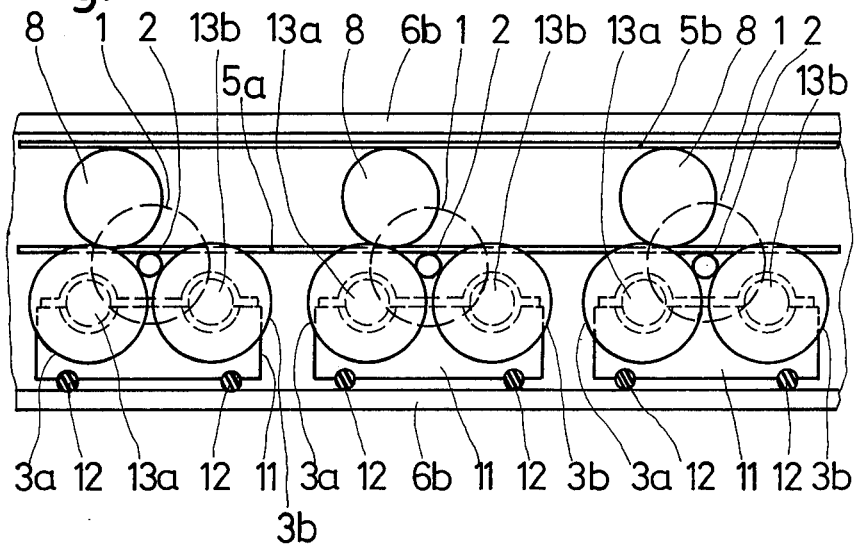
Figure 2:
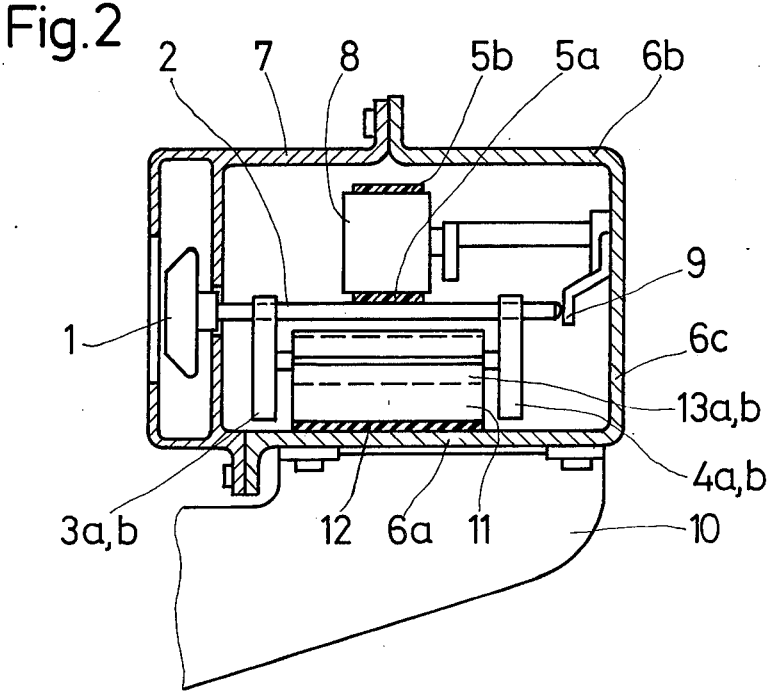
FIG. 2 shows a section through the enclosed channel.

Referring now to the drawings, wherein like reference numerals designate like parts throughout the several views, FIGS. 1 and 2 show only the spinning rotors 1 of an open-end spinning machine, as well as their drive and bearing means. Each spinning point also includes further means for supplying and opening a sliver and for removing the spun thread, which are not illustrated as they are not required for explaining the present invention. Each spinning rotor 1 has a shaft 2, which is mounted in a wedge formed by supporting rings 3a, 3b and 4a, 4b. Axial support of rotor shaft 2 is provided by a step bearing 9, against which the rotor shaft is pressed with an intentionally produced axial force, which is preferably maintained by slightly inclining the axes of the supporting rings one relative to the other. Shaft 2 is driven directly by a tangential belt 5a, which also presses shaft 2 into the wedge. In the area of each spinning point, the tangential belt is subjected to pressure by a pressure pulley 8, the upper side of which guides the return side 5b.

The drive and bearing means are arranged in an enclosed channel extending longitudinally through the machine and formed from a section having a bottom 6a, a top 6b and a rear wall 6c, and being closed in front by means of a lid 7, which separates the channel from a chamber which is opened to the front and in which spinning rotor 1 is arranged. The channel simultaneously serves as the supporting structure for the drive and bearing means of the individual spinning points, and is connected with the machine frame at a plurality of points by means of supporting arms 10.

Two supporting rings at each point, namely supporting rings 3a and 4a as well as supporting rings 3b and 4b, have a common bearing 13a and 13b, with which they are retained in a common pillow block 11, with a separate pillow block 11 being associated to each spinning point and holding bearings 13a and 13b of the supporting rings of a spinning point. Pillow blocks 11 have seats for bearings 13a and 13b which are designed in such a manner that their axes are slightly inclined one toward the other about an axis which extends parallel to the direction of travel of tangential belt 5, causing an axial force to be exerted against rotor shaft 2 of each spinning point, which presses it against step bearing 9.

In order to provide a soundproofing effect, pillow blocks 11 are in a supporting relationship with bottom 6a of the profile by means of elastic supporting means 12. These elastic supporting means 12 are designed in such a manner that they have a preferred direction of travel in which they yield, so that oscillations generally occur only in this direction. This preferred direction of travel is selected in such a manner as to preclude seesaw oscillations of rotor shafts 2 in an axis extending in the direction of tangential belt 5a or at right angles thereto. Pillow blocks 11 can only move in such a manner that rotor shafts 2 do not give up their parallel position relative to the initial position. This ensures that the angle between tangential belt 5a and rotor shaft 2 does not change, which would undesirably influence the magnitude of the axial force.

Figure 3:
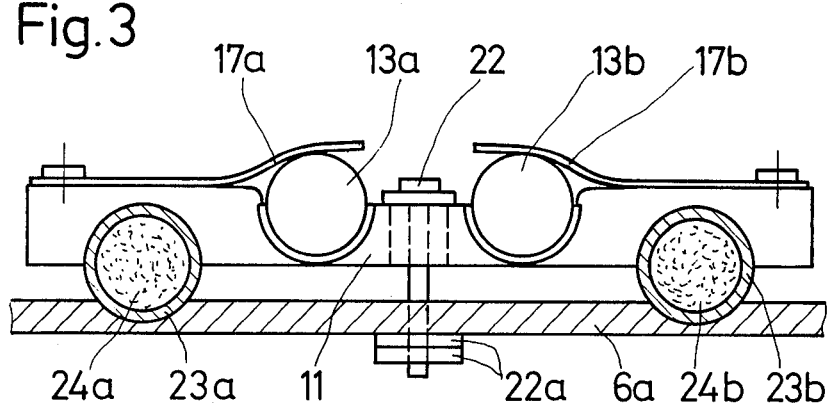
FIG. 3 shows a detail of FIG. 1 with a larger scale.

In FIG. 3, the elastic supporting means comprise thin-walled tubes 23a and 23b of an elastic material, in particular of a plastic. The interior of tubes 23a and 23b is filled with a dampening material 24a, 24b, for example an elastic foam. Pillow blocks 11, which retain bearings 13a and 13b with clamp-like spring members 17a and 17b, are attached by means of draw screws 22, which penetrate bottom 6a and are retained by nuts 22a tensioned one against the other. Instead of tubes 23a and 23b, it is also possible to employ plastic cylinders or similar members. Moreover, it is also possible for these cylindrical supporting members, which are automatically centered in seats in bottom 6a and pillow blocks 11, to be equipped with metal inserts, which ensure that the elasticity is generally limited to preferred directions, in particular to vertical, and possibly horizontal, movement, while precluding the possibility of seesaw oscillations. These metal inserts can have a plate-like configuration, for example, and have a relatively large extension, and thus high degree of strength, in the horizontal direction and relatively small extension, and thus strength, in the vertical direction.

Figure 4:
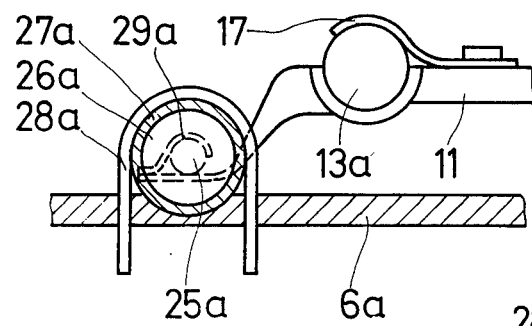
FIG. 4 shows a detail of a further bearing means.
Figure 5:
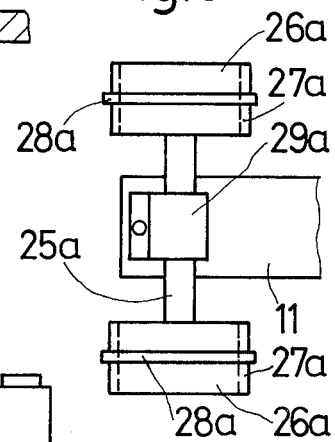
FIG. 5 shows a top view of the bearing means according to FIG. 4.

Attached to pillow block 11 in FIGS. 4 and 5, only approximately half of which is illustrated, on each side with the aid of clamp-like clamping means 29a is a steel axle 25a with a disc 26a at each end. These discs 26a have a coating 27a of an elastic and preferably oscillation dampening plastic. Discs 26a, with coating 27a, are attached to bottom 6a, which has a groove-shaped seat, by means of U-shaped retaining members 28a.

Figure 6:
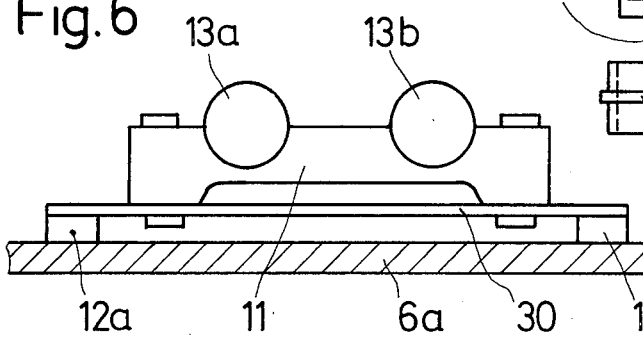
FIG. 6 shows a view of a further embodiment having a leaf spring as the supporting means.

In the embodiment according to FIG. 6, a pillow block 11 is attached to a leaf spring 30, which is arranged somewhat above bottom 6a with the aid of supporting means 12a and 12b, permitting the pillow block to spring downward somewhat. Leaf spring 30, which extends parallel to the plane of the unillustrated tangential belt, generally only permits movements at right angles to the tangential belt, thereby quite dependably precluding the undesirable seesaw oscillations.

Figure 7:
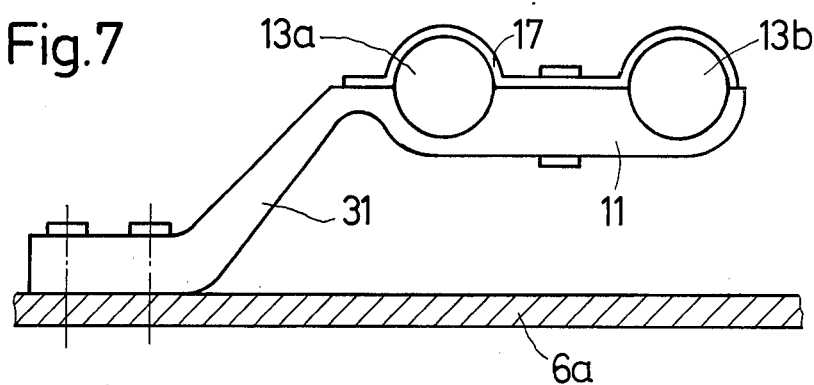
FIG. 7 shows a bearing means having a holder arm which is elastic in one direction.

In the embodiment according to FIG. 7, a pillow block 11 is retained at a distance from bottom 6a with the aid of an arm 31, which is followed by a side edge extending parallel to the axes of bearings 13a and 13b. In the illustrated embodiment, supporting arm 31 and pillow block 11 are designed as one and the same member. Supporting arm 31 is relatively wide in the direction of the axes of bearings 13a and 13b, while otherwise being relatively thin-walled and thus elastic. Pillow block 11 can therefore only swing up and down relative to bottom 6a, while dependably precluding seesaw oscillations.

Figure 8:
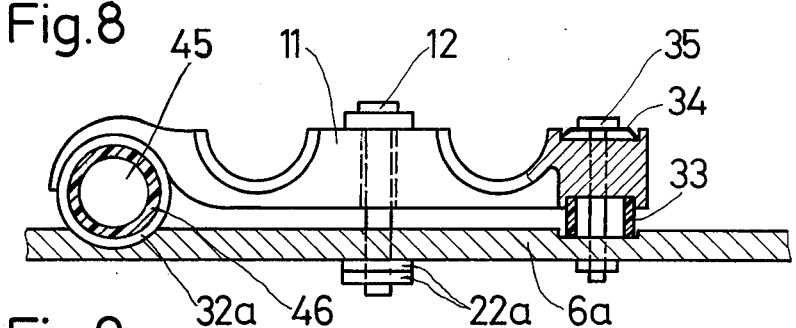
FIGS. 8 to 10 show embodiments having two different types of supporting means.

In the embodiment according to FIG. 8, the two sides of a pillow block 11 are in supporting relationships with bottom 6a by means of two different types of supporting members. The supporting member at the left side of the drawing is of cylindrical design and serves to produce a preferred direction of travel. The supporting member at the right side of the drawing, on the other hand, generally serves to provide the best possible dampening of the oscillations. The supporting member at the left side of the drawing comprises an axle 45 having a sleeve-like coating 46 of plastic. This plastic 46 is relatively hard and non-elastic. Outside and at the side of pillow block 11, coating 46 of axle 45 has bushing-like rings 32a, which are seated in a trough-like depression in bottom 6a. Axle 45 does not provide a metallic connection between bottom 6a and pillow block 11.

Pillow block 11 can pivot about axle 45, with the pivotal motion being limited by a sleeve-shaped buffer 33 arranged on the other side of pillow block 11. This ensures that the pillow block has a preferred direction of travel, which is represented by the pivotal motion about axle 45. This means that the bearings of the supporting rings and the rotor shaft can also only describe orbits about axle 45, so that the rotor shaft is always located in a position which is parallel to its original position. Pillow block 11 is attached to bottom 6a by means of a screw 35 in the area of buffer 33. Arranged between the head of screw 35 and pillow block 11 is an elastic member, preferably a cup spring 34, which permits the motions. In addition, pillow block 11 is also attached to bottom 6a by means of a screw 22 and nuts 22a which are tensioned one against the other. It is practical to provide inserts of an elastic material between pillow block 11 and screw 22.

Figure 9:
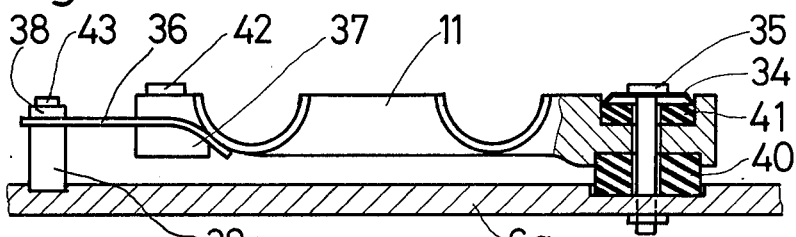
Figure 10:
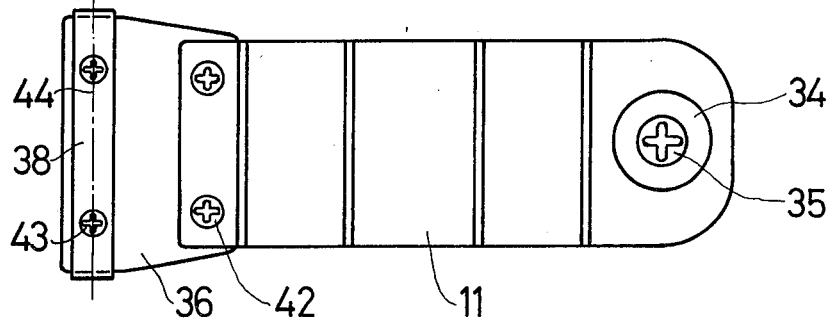

In the embodiment according to FIGS. 9 and 10, one side of pillow block 11 is attached to bottom 6a with a rubber buffer 40 in a manner which is similar to that of the embodiment according to FIG. 8. In this embodiment, bottom 6a comprises a solid block of plastic, as is known under the trade-name Vulkollan for example. In this area, pillow block 11 is attached to bottom 6a in a corresponding manner with a screw 35 and a cup spring 34. The opposite side of pillow block 11 is retained by means of a leaf spring 36, extending parallel to the plane of the unillustrated tangential belt. The leaf spring is fixed at one end between two retaining members 39 and 38, which are clamped to bottom 6a by means of screws 43, which extend parallel to the seats for bearings 13a and 13b of the supporting rings, and thus parallel to the rotor shaft. At the edge of pillow block 11, the other end of leaf spring 36 is also fixed by means of a clamping member 37 and screws 42. In this embodiment, leaf spring 36 serves as a type of pivot, which forms an axis which is parallel to the seats for bearings 13a and 13b of the supporting rings, and thus also to the rotor shaft, and about which pillow block 11 can move. Movements in other directions are prevented by leaf spring 36, as it is largely rigid in all other directions.

Obviously, many modifications and variations of the present invention are possible in the light of the above teachings. It should therefore be understood that within the scope of the appended claims, the invention may be practiced otherwise than as specifically described.

Having thus fully disclosed my invention, what I claim is:

1. A bearing arrangement for a spinning unit of an open-end spinning machine, the spinning unit including a spinning rotor having a rotor shaft driven by a tangential belt, the shaft is mounted in a wedge formed by supporting rings having bearing elements, the bearing arrangement comprising: one common pillow block means for mounting bearing elements of the supporting rings of the spinning unit, and elastic supporting means having a preferred direction of movement for supporting said pillow block means at the spinning unit and for preventing seesaw movements of the rotor shaft about an axis located at right angles to the shaft.

2. The bearing arrangement according to claim 1, wherein said elastic supporting means includes at least one cylindrical elastic supporting element arranged at the spinning unit so as to extend parallel to the axis of the rotor shaft.

3. The bearing arrangement according to claim 1, wherein said elastic supporting means includes a holder arm means laterally engaging an edge of said pillow block means which extends parallel to the axis of the rotor shaft and which is more resistant to deflection in the direction of this edge than in a direction perpendicular thereto.

4. The bearing arrangement according to claim 1, wherein said elastic supporting means includes at least one leaf spring member extending parallel to the plane of the tangential belt.

5. The bearing arrangement according to claim 1, wherein said elastic supporting means includes a means for stipulating a preferred direction of movement of the rotor shaft and means for damping oscillations of the rotor shaft.

6. The bearing arrangement according to claim 5, wherein said means for stipulating a preferred direction of movement includes a leaf spring extending parallel to the plane of the tangential belt, and wherein said damping means includes a resilient buffer extending at right angles to the leaf spring.

7. The bearing arrangement according to claim 5, wherein said means for stipulating a preferred direction includes a cylindrical supporting means extending parallel to the axis of the rotor shaft, and wherein said damping means includes a resilient buffer.

8. The bearing arrangement according to claim 3, wherein said holder arm means and said pillow block and means are fashioned as a single element.

9. The bearing arrangement according to claim 1, wherein said elastic supporting means includes a supporting arm for supporting said pillow block means at a predetermined distance from a wall of the spinning machine.

10. The bearing arrangement according to claim 9, wherein said supporting arm is relatively wide in a direction of the axis of the bearing element and relatively thin walled in other directions so as to permit elastic deformation of the supporting arm.

11. The bearing arrangement according to claim 1, wherein said elastic supporting means includes an axle, disc means mounted at each end of said axle, and dampening means provided on said disc means.

12. The bearing arrangement according to claim 11, wherein said dampening means consists of a coating provided on each of said disc means.

13. The bearing arrangement according to claim 12, wherein means are provided for retaining said disc means at the spinning machine.

14. The bearing arrangement according to claim 13, wherein said retaining means includes a groove means provided in a wall of the machine for accommodating said disc means, and a clamping means for retaining said disc means in said groove means.

* * * * *